July 13, 1965     W. H. HILL     3,194,939

RESISTANCE WELDING PROCESS INDICATING SYSTEM

Filed Sept. 28, 1962     2 Sheets-Sheet 1

INVENTOR.
WILLIAM H. HILL,
BY Walter R. Thiel
ATTORNEY

INVENTOR.
WILLIAM H. HILL,
BY Walter R. Thiel
ATTORNEY.

United States Patent Office 3,194,939
Patented July 13, 1965

3,194,939
RESISTANCE WELDING PROCESS INDICATING
SYSTEM
William H. Hill, Carlsbad, Calif., assignor to Hughes Aircraft Company, Culver City, Calif., a corporation of Delaware
Filed Sept. 28, 1962, Ser. No. 226,803
3 Claims. (Cl. 219—109)

This invention relates to a weld process indicating device for an electric resistance welding system and more particularly to a device to indicate the current, power or energy expended in the material being welded by the welding system.

In resistance welding two or more members are jointed together by passing electric current through the parts at the desired point of welding through electrodes which engage these members and apply a predetermined pressure thereto. The resistance welding operation may be variously modified by controlling the time of current flow, the pattern of current flow, and the welding pressure. For any particular operation a predetermined procedure is established which will produce welds of desired quality and strength. Since the weld occurs between the juxtaposed surfaces, it is hidden from view. It is, therefore, desirable to provide some means of protecting against any change from the original welding set-up conditions which may occur while a welding operation is being repeated. For example, variations in welding current flow may occur due to variations in the supply voltage or faulty operation of the current control apparatus. Likewise, variations in force may occur due to faulty operation of the welding machine or the wear imposed on the electrodes which causes them to change their area of contact with the work. This variation in contact area between the electrodes and the work may also produce a change in current density at the weld and thus also produce defective welds. There is also the variable factor resulting from variations in the surface condition of the parts being welded since this will affect the flow of welding current through the parts and the heating effect produced at their contacting surfaces. These and other variables may be productive of defective welds.

It is not possible to determine the strength of a resistance weld by a mere visual observation thereof. It is, of course, possible to make destructive tests of the weld, but this cannot be applied to a finished article employing the weld. Consequently, quality control procedures have been established whereby, through a sampling process, the departure from established welding conditions is detected before the strength and quality of the welds being made have deteriorated beyond established manufacturing limits which require the welds to be of predetermined strength and quality. Other procedures have been proposed to determine the strength and quality of welds by using such nondestructive tests as examination by X-ray and by the use of ultrasonics. Certain other tests have been proposed which depend upon the voltage across the weld, the electric input to the weld, and the resistance change of the weld.

One such a system is shown and described in U.S. Patent No. 2,848,595, by H. D. Van Sciver II, issued August 19, 1958. This system develops two signals, one a signal proportional to the ratio of the voltage across and the current through a workpiece and the other a predetermined function signal to be folllowed by the workpiece resistance. The system continuously compares the two signals and varies the input to the workpiece according to any error. While this feedback system has given satisfactory control of a resistance welding operation, its use has been limited to resistance welding systems utilizing A.C. power supplies because of the necessity that there be a continuous input to the electrodes which can be varied according to any error.

Another system is shown and described in U.S. Patent No. 2,740,044 by H. F. Storm issued March 27, 1956. This system is responsive to the percentage drop in resistance across a weld during its formation and utilizes electronic computer circuits to provide a control which compares this with a desired percentage change in the resistance of a weld. While under certain application this system has given satisfactory resistance welding monitoring and control, it has proven unsatisfactory for general welding application because of its complexity and expense.

It is therefore an object of this invention to provide an improved means for obtaining a representation of the magnitude of the energy expended in the material being welded during a welding operation by a resistance welding system.

It is another object of this invention to provide a means for developing an electrical signal representative of the energy expended in the material being welded by a resistance welding system and to provide an indication of the magnitude of this signal.

It is a further object of this invention to provide a means for developing an electrical signal representative of the magnitude of the peak power expended in the material being welded by a resistance welding system and to provide an indication of the magnitude of this signal.

In general, the present invention comprises a novel circuit arrangement which includes a current and voltage sensitive circuit and an amplifying and indicating circuit. The curent and voltage sensitive circuit includes a magnetic field developed by the welding current and a Hall element having an electric field selectively developed by either the voltage between the electrodes of a welding head during a welding operation or a constant signal source, and has an output signal representative of either the product of the welding current and the voltage between the electrodes or the instantaneous welding current depending upon the electrical electric field coupled to the Hall element.

Other advantages of the invention will hereinafter become more fully apparent from the following description of the drawings which illustrate a preferred embodiment of the present invention and wherein.

Figure 1:
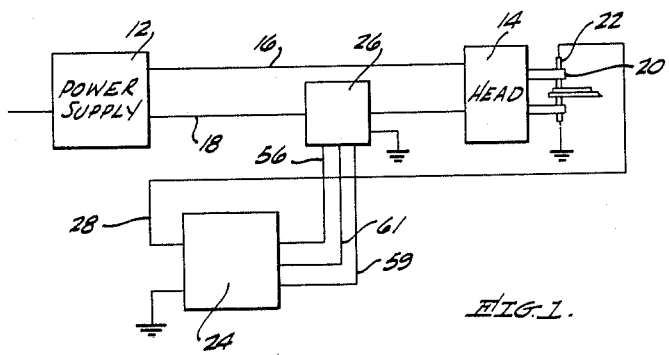
FIGURE 1 is a block diagram illustrating a welding system having a power supply, a welding head and the improved weld energy indicating system of the present invention.

Referring now to FIG. 1 a resistance welding power supply 12 such as that shown and described in U.S. Patent No. 2,483,691 by J. W. Dawson, issued October 4, 1949, supplies welding energy to a welding head 14 through a pair of conductors 16, 18. The welding head 14 includes a pair of horns 20, each supporting an electrode 22. One of the horns 20 is movable relative to the other to enable the electrodes to contact the material to be welded with the correct amount of pressure. Such a welding head is more completely shown and described in U.S. Patent No. 2,467,090 by G. B. Martin, issued April 12, 1949. In combination with the power supply 12 and the welding head 14 are the primary elements of the present invention which include an amplifying and indicating circuit 24 and a current and voltage sensitive circuit 26.

Figure 2:
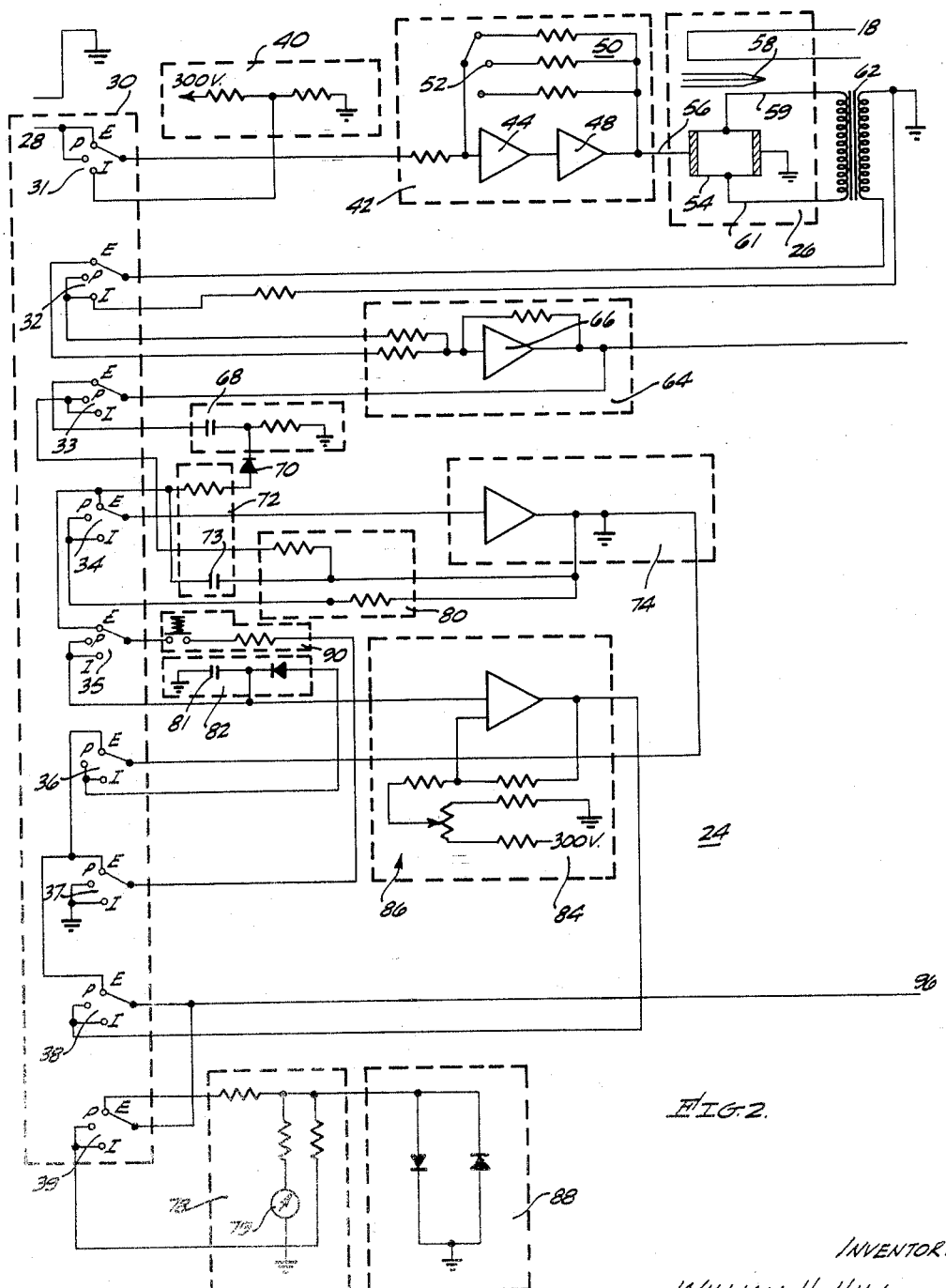
FIG. 2 is a schematic circuit diagram illustrating the details of the present invention.

Referring to FIG. 2 the indicating circuit 24 includes an operating switch arrangement 30 which includes nine ganged switches, having reference numerals 31 through 39, each of which includes an energy, power, and current position, these positions corresponding on FIG. 2 to the E, P, and I contacts shown in relationship with each of the nine switches. Typically, the switch arrangement 30 is of the rotary contact type wherein each of the contacts is mounted around a rotatable shaft containing a wiper so that by rotating the shaft to a predetermined position each of the switches engages the same relatively positioned contact. The circuit components (to be described below) are arranged in association with the E, P, and I contacts on the nine switches to provide a representation of the physical quantity when selected by the rotation of the shaft.

To supply the indicating and amplifying circuit 24 with an electrical signal representative of the voltage across the welding electrodes, one of the electrodes 22 is coupled by a conductor 28 to the E and P contacts of the first switch 31 while the other electrode is coupled to ground. To supply a source of constant potential to the indicating circuit 24, a source of potential including a voltage dividing network 40 is connected to the I contact. Thus, when the operating switch arrangement 30 is rotated to the E or P position the indicating circuit 24 is coupled to the electrode 22; but, when it is in the I position it is coupled to a constant source of potential.

To amplify the signal representative of the voltage between the electrodes or the constant voltage signal, the arm or wiper of the first switch 31 is connected to a first conventional amplifier circuit 42 which includes a first operational amplifier 44, such as a K2-W type manufactured by G. A. Philbrick Researches, Inc., and for additional amplification a booster amplifier follower 48 such as an SK-2B type manufactured by G. A. Philbrick Researches, Inc., is coupled in cascade to the operational amplifier 44. In parallel with this amplifier pair is a plurality of feedback resistors 50 each selectable by a switch 52 to control the gain of the amplifiers to correspond to a selected range of measurement.

Figure 3:
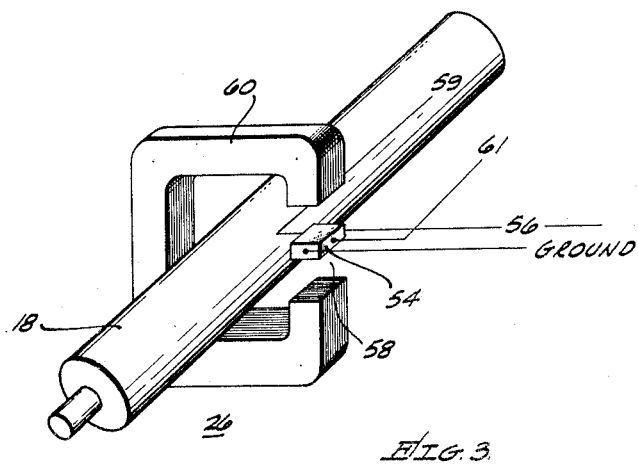
FIG. 3 is a perspective view of a typical Hall generator of the type shown schematically in FIG. 2.

Now, referring also to FIG. 3, to provide an element control current to a Hall element 54 such as a Model 350 type manufactured by Beckman Instruments, Inc., included in the current and voltage circuit or Hall generator circuit 26, one input lead of the Hall element 54 is coupled by a conductor 56 to receive the output signal from the first amplifier circuit 42 and the other input lead of the element is coupled to ground. To establish a magnetic field 58, necessary for the operation of the Hall generator circuit 26, the conductor 18 supplying the welding current from the power supply 12 to the welding head 14 passes through the center of a conventional laminated C-shaped iron core 60. While the Hall element 54 has been shown in combination with an iron core 60, it should be understood that with the use of a Hall element of improved sensitivity the iron core 60 may be eliminated and a magnetic field of sufficient flux density to operate the element may be provided directly by an air coupling when the Hall element 54 is positioned at a specific distance from the center of the conductor 18.

When an electric field is imposed upon a conductor or semi-conductor, electrons drift from one current electrode to another and if a magnetic field is imposed in the transverse direction to the movement of the electrons they are deflected and a charge builds up along the boundary of the current carrying element thus creating a voltage across the width of the element. In the present application, since the magnetic field 58 is developed by the welding current and the electric field is developed by either a signal proportional to the voltage drop between the electrodes or a reference signal, the output signal from the Hall generator circuit 26 is proportional to either the instantaneous product of the welding current and the voltage drop across the electrodes or the instantaneous welding current depending upon which electrical signal is supplied to the Hall element 54.

Referring now only to FIG. 2, the output signal of the Hall element 54 is coupled by a pair of conductors 59, 61 through a transformer 62 and the second switch 32 to a second amplifying circuit 64 which includes a plurality of resistors, a second operational amplifier 66 such as described above. To control the gain of the amplifier 66 the resistors are connected to the E, P, and I contacts of the second switch 32 so that the amplifier 66 has one level of gain when the operating switch arrangement 30 is in either the I position or the P position and a larger level of gain when it is in the E position.

The output signal of the second amplifier circuit 64 is coupled to the arm or wiper of the third switch 33 and connected to the E contact of said switch is a coupling circuit 68 comprising a capacitor and a resistor connected between one side of the capacitor and ground. The coupling circuit 68 is coupled through a diode 70 and the fourth switch 34 to an integrating circut 72 including a resistor and a capacitor 73 and a third operational amplifier 74 such as a USA-3 type manufactured by Philbrick Researches, Inc. The diode 70 permits only the negative signal passed by the coupling circuit 68 to pass to the integrating circuit 72. The output signal of the integrating circuit 72 is coupled directly through the E contacts of the sixth, the eighth, and the ninth switches 36, 38, and 39, respectively, and conventional resistance coupling, to a meter circuit 78 including a microammeter 79 such as a 0–100 as manufactured by Weston Instruments Division, Daystrom, Inc., and a plurality of resistors.

Coupled to the P and I contacts of the third and fourth switches 33 and 34 is a series and a parallel resistor combination 80 both of which have the same resistance value. When the operating switch arrangement 30 is in the P or I position, the second operational amplifier 64 serves as an inverter and not as an integrator because the resistor and the capacitor 73 of integrating circuit 72 are no longer in the circuit with the amplifier 64 but are replaced by the series and parallel resistor combination 80. In this operation the output signal from the second operational amplifier 64 is connected through the amplifier 74 and the P and I contacts of the third and sixth switches 33, 36 to a peaking circuit 82 including a diode having a polarity to pass only positive signals which are stored in a capacitor 81. As the charge builds up in the capacitor 81, the diode is biased accordingly and is conductive only when subsequent positive signals exceed the progressive buildup of charge stored in the capacitor. The diode is typically of a conventional nature and is of a power rating suitable for the amplifying circuit 24. The output signal from the peaking circuit 82 is supplied to a third operational amplifier 84 which includes a feedback circuit 86. It provides an impedance matching device for the meter circuit 78 which is coupled through the P and I contacts of the eighth and ninth switches 38, 39 to the amplifier 84. This is provided so that the meter circuit does not constitute a resistance load to the capacitor 81 through which it may discharge.

The ninth switch 39 functions to couple different resistors of varying resistance value into the meter circuit 78 to maintain the current supply to the circuit relatively constant for all three positions of the operating switch arrangement 30. In parallel with the indicating circuit is a conventional protection circuit 88 such as a pair of oppositely biased diodes. When the current supply to the indicating circuit is above the rated value for the circuit one of the diodes is rendered conductive depending upon the polarity of the signal to conduct the excess current to ground.

To reset both the integrating circuit 72 and the peaking circuit 82 a reset circuit 90 including a switch, such as a push-button switch, and a discharge resistor are provided in a circuit connected between the wipers of the fifth and a seventh switches 35, 37. To reset the integrating circuit 78 the capacitor 73 is discharged through the reset circuit 90 when the operating switch 30 is in the E position and the reset circuit is actuated by depressing the switch button; while to reset the peaking circuit the capacitor 81 of the peaking circuit 82 is likewise discharged through the reset circuit 90 when the operation switch 30 is in the I or P position and the reset circuit 90 is actuated by depressing the switch button.

To provide the auxiliary facility for display or recording the instantaneous power or current on an oscilloscope or other recording device a connection 94 such as a conventional jack or plug is made to the circuit to receive the output signal from the second amplifying circuit 64. Thus at this point, before the signal is integrated, a visual indication or recording can be made of the instantaneous value of the signal. In addition, to provide an auxiliary facility for recording or displaying the energy or peak power or peak current a connection 96 like that discussed above is made to the circuit at the wiper of the eighth switch 38.

To summarize the operation of the indicating circuit 24, when an indication of the energy expended in the material being welded is desired the operating switch 30 is placed in the E or energy position and the proper range or multiplying factor for the meter indication for the particular value of the watt second welding power supplied by the power supply is selected by the range selection switch 52. As the welding operation is initiated a current analogous to the voltage existing between the electrodes is first amplified and then supplied to the Hall element 54 as a control current. The welding current provides the magnetic field 58 for the Hall generator circuit 26 which develops an output signal representative of the product of the welding current and the voltage between the electrodes. This output signal is transformer coupled to the amplifying and the integrating circuits and to the meter circuit 78 for a visual indication of its magnitude on the microammeter 79.

When it is desirous to obtain an indication of the instantaneous welding current, the operating switch 30 is rotated to the I or current position. This applies a constant control signal to the Hall element 54 and since the welding current supplies the magnetic field 58 for the Hall generator circuit 26 the output signal thereof is representative of the instantaneous welding current. This output signal is transformer coupled to the amplifying and the peaking circuit and to the meter circuit.

If an indication of peak power is desired the operating switch 30 is rotated to the P or power position. Now the Hall element 54 receives a control current analogous to the voltage between the electrodes rather than a constant reference signal as in the I position because the E and P contacts on the first switch 31 are coupled together. In this position the output signal of the Hall generator circuit 26 is amplified and supplied to the meter circuit 78 in the same manner as for the I position because the I and P contacts on the second through the ninth switches are coupled together.

While but one embodiment of this invention has been herein illustrated, it will be appreciated by those skilled in the art that variations in the disclosed arrangement, both as to its details and as to the organization of such details may be made without departing from the spirit and scope hereof. Accordingly, it is intended that the foregoing disclosure and the showings made in the drawings shall be considered only as illustrative of the principles of this invention and not construed in a limiting sense.

I claim as my invention:

1. In combination with an electric resistance welding system, including a power supply, a load circuit including a pair of welding electrodes, a pair of conductors electrically connecting said electrodes to said power supply, and a constant signal source, a welding process indicating device comprising:
   a multicontact switch having first, second and third positions representing different welding parameters and having said power supply connected to said first and second positions and said constant signal source connected to said third position;
   a Hall effect device electrically connected to said switch and adapted to have said power supply coupled thereto when said switch is in either said first or second position and to have said constant power supply coupled thereto when said switch is in said third position, said Hall device being juxtaposed to one of said conductors to be responsive to a magnetic field when said power supply is actuated;
   an integrating circuit means electrically connected to said switch and adapted to be energized only when said switch is in said first position for totalizing with respect to time the power developed in the weld being monitored;
   a peaking circuit means and an inverter amplifier circuit means electrically connected to said switch and adapted to be energized only when said switch is in either its second or third position for developing a signal representative of the instantaneous magnitude of the selected parameter; and
   a meter circuit coupled to said switch to indicate the magnitude of the welding parameters represented by the selected position of said switch.

2. In combination with an electric resistance welding system, including a power supply, a load circuit including a pair of welding electrodes, a pair of conductors electrically connecting said electrodes to said power supply, and a constant signal source, a welding process indicating device comprisnig:
   a multicontact switch having first, second and third positions representing different welding parameters and having said power supply connected to said first and second positions and said constant signal source connected to said third position;
   a Hall effect device electrically connected to said switch and adapted to have said power supply coupled thereto when said switch is in either said first or said second position and to have said constant power supply coupled thereto when said switch is in said third position, said Hall device being juxtaposed to one of said conductors to be responsive to a magnetic field when said power supply is actuated;
   an integrating circuit means electrically connected to said switch and adapted to be energized only when said switch is in said first position for totalizing with respect to time the power developed in the weld being monitored;
   a peaking circuit means and an inverter amplifier circuit means electrically connected to said switch and adapted to be energized only when said switch is in either its second or third position for developing a signal representative of the instantaneous magnitude of the selected parameter;
   and a reset circuit electrically connected to said switch and adapted to reset said integrating circuit means when said switch is in said first position and adapted to reset said peaking circuit means when said switch is in either its second or third position; and
   a meter circuit coupled to said switch to indicate the magnitude of the welding parameters represented by the selected position of said switch.

3. In combination with an electric resistance welding system, including a power supply, a load circuit including a pair of welding electrodes, a pair of conductors electrically connecting said electrodes to said power supply, and a constant signal source, a welding process indicating device comprising:

a multicontact switch having E, P and I positions representing the welding parameters energy, power and peak current and having said power supply connected to said E and P positions and said constant signal source connected to said I position;

a Hall effect device electrically connected to said switch and adapted to have said power supply coupled thereto when said switch is in said E and P position and to have said constant power supply coupled thereto when said switch is in said I position, said Hall device being juxtaposed to one of said conductors to be responsive to a magnetic field when said power supply is actuated;

wherein said device has an output signal representative of the product of the instantaneous welding current in the weld being monitored and the voltage developed across said weld by the contact of said electrodes when said switch is in the E or P position and an output signal representative of the instantaneous magnitude of the current pulse generated by said power supply;

an amplifying circuit means electrically connected to said switch and energized when said switch is in any one of the three positions for amplifying the output signal from said Hall device;

an integrating circuit means electrically connected to said switch and adapted to be energized only when said switch is in said E position for totalizing with respect to time the power developed in the weld being monitored;

a peaking circuit means and an inverter amplifier circuit means electrically connected to said switch and adapted to be energized only when said switch is in either its P or I position for developing a signal representative of the instantaneous magnitude of the selected parameter;

a reset circuit electrically connected to said switch and adapted to reset said integrating circuit means when said switch is in said E position and adapted to reset said peaking circuit means when said switch is in either its P or I positon; and a meter circuit coupled to said switch to indicate the magnitude of the welding parameters represented by the selected position of said switch.

References Cited by the Examiner

UNITED STATES PATENTS

| | | | |
|---|---|---|---|
| 1,979,786 | 11/34 | Andrus | 219—109 |
| 2,093,982 | 9/37 | Ragsdale et al. | 219—109 X |
| 2,370,009 | 2/45 | Clark et al. | 219—110 |
| 2,694,762 | 11/54 | Ruetschi | 219—110 |
| 2,736,822 | 2/56 | Dunlap | 324—117 |

OTHER REFERENCES

Turner, R. P.: "Semiconductor Devices," pp. 240–246, pub. 1961 by Holt, Rinehart and Winston, Inc., New York City.

"Standard Handbook for Electrical Engineers," 6th ed. McGraw-Hill Book Co., New York City, sec. 3–8 (p. 135).

RICHARD M. WOOD, *Primary Examiner.*